(12) United States Patent
Dimitrov et al.

(10) Patent No.: US 9,042,061 B2
(45) Date of Patent: May 26, 2015

(54) DEPOLARIZING LAYER IN A MAGNETIC STACK

(71) Applicant: Seagate Technology LLC, Cupertino, CA (US)

(72) Inventors: Dimitar Velikov Dimitrov, Edina, MN (US); Dian Song, Eden Prairie, MN (US); Mark Thomas Kief, Lakeville, MN (US); Amit Sharma, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/020,408

(22) Filed: Sep. 6, 2013

(65) Prior Publication Data

US 2015/0070799 A1 Mar. 12, 2015

(51) Int. Cl.
*G11B 5/39* (2006.01)
*G11B 5/31* (2006.01)

(52) U.S. Cl.
CPC ............... *G11B 5/31* (2013.01); *G11B 5/3903* (2013.01); *G11B 5/3929* (2013.01)

(58) Field of Classification Search
CPC ...... G11B 5/39; G11B 5/3903; G11B 5/3906; G11B 5/3909; G11B 5/3929
USPC .......... 360/324, 324.1, 324.11, 324.12, 324.2
See application file for complete search history.

(56) References Cited

U.S. PATENT DOCUMENTS

| | | | |
|---|---|---|---|
| 6,903,904 B2 * | 6/2005 | Li et al. | 360/324.11 |
| 7,099,122 B2 | 8/2006 | Yi et al. | |
| 7,522,392 B2 | 4/2009 | Carey et al. | |
| 8,295,006 B2 | 10/2012 | Sugano et al. | |
| 8,339,750 B2 | 12/2012 | Sasaki | |
| 2003/0030945 A1 * | 2/2003 | Heinonen et al. | 360/324.2 |
| 2004/0075957 A1 * | 4/2004 | Li et al. | 360/324.11 |
| 2004/0257714 A1 | 12/2004 | Takahashi et al. | |
| 2005/0002128 A1 | 1/2005 | Ito et al. | |
| 2006/0262458 A1 | 11/2006 | Carey et al. | |
| 2007/0053113 A1 * | 3/2007 | Papworth Parkin | 360/324.2 |
| 2007/0139820 A1 * | 6/2007 | Carey et al. | 360/126 |
| 2007/0253121 A1 | 11/2007 | Yamada et al. | |
| 2008/0074802 A1 * | 3/2008 | Carey et al. | 360/324.1 |

* cited by examiner

*Primary Examiner* — Jefferson Evans
(74) *Attorney, Agent, or Firm* — Hall Estill Attorneys at Law

(57) ABSTRACT

A data reader may be configured at least with a magnetic stack positioned on an air bearing surface (ABS) and contacting a spin depolarizing layer that is a minority spin current carrier. The spin depolarizing layer can have a thickness and spin diffusion length corresponding to a net zero spin polarization at an interface of the magnetic stack and spin depolarizing layer.

20 Claims, 5 Drawing Sheets

DEPOLARIZING LAYER IN A MAGNETIC STACK

SUMMARY

Assorted embodiments configure a data reader to have at least a magnetic stack positioned on an air bearing surface (ABS) and contacting a spin depolarizing layer that is a minority spin current carrier. The spin depolarizing layer can have a thickness and spin diffusion length corresponding to a net zero spin polarization at an interface of the magnetic stack and spin depolarizing layer.

DETAILED DESCRIPTION

Meeting consumer and industry demand for larger data capacity and faster data access in reduced form factor data storage devices has corresponded with minimizing the physical size of data storage components while more densely positioning data bits on a data medium. The minimization of data storage components, particularly data reading laminations, has stressed the magnetic reliability of various magnetic materials functioning on a nanometer scale. While a variety of different data storage component structures can reduce the magnetic size of a lamination of layer without decreasing the physical size of constituent layers, operational issues can plague data access speed and accuracy. Hence, increasing magnetic integrity in reduced form factor magnetic lamination has been a continued goal of industry.

The hindering of magnetic performance in reduced form factor data storage magnetic laminations has rendered positioning a magnetic stack on an air bearing surface (ABS) and contacting a spin depolarizing layer that is a minority spin current carrier while being configured with a thickness and spin diffusion length corresponding to a net zero spin polarization at an interface of the magnetic stack and spin depolarizing layer. The ability to tune the spin depolarizing layer to provide a net zero spin polarization can preserve the spin accumulation in Lateral Spin Valve (LSV) readback head. That is, the spin depolarizing layer can depolarize sensing current that may contaminate spin accumulation signal, which can consequently optimize magnetic performance of the magnetic stack by increasing readback voltage.

Figure 1:
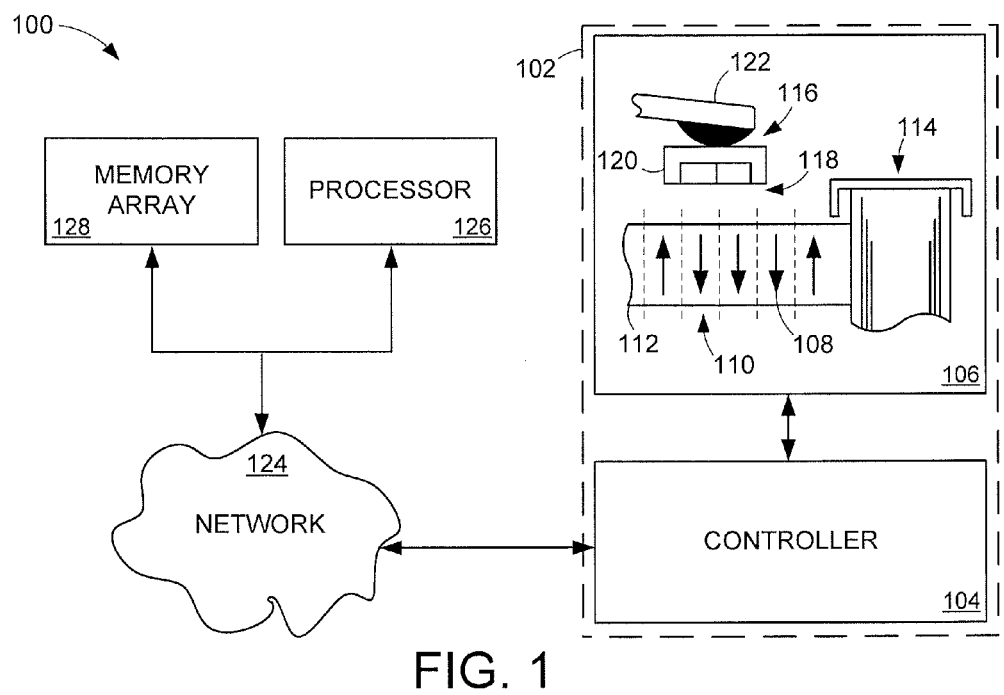
FIG. 1 is a block representation of a portion of an example data storage system configured in accordance with some embodiments.

An unlimited variety of data sensing environments may employ at least one spin depolarizing layer. FIG. 1 generally displays an example data storage system 100 constructed and operated in accordance with various embodiments to provide a data sensing environment capable of utilizing a spin depolarizing layer. The data storage system 100 may have any number of data storage devices 102 that comprise a local controller 104 and a data transducing assembly 106, such as in a redundant array of independent discs (RAID) or cloud computing environment. The single data transducing assembly 106 shown in FIG. 1 illustrates how a plurality of magnetic data bits 108 can be arranged in data tracks 110 on a data medium 112 that is controlled by a centrally positioned spindle motor 114.

An actuating assembly 116 can be configured to float a predetermined distance above the data bits 108 and data medium 112 on an air bearing 118. The actuating assembly 116 can have at least one transducing head 120 suspended on an actuating arm 122 that allows one or more transducing means to pitch and roll to access selected data bits 108 and tracks 110. In this way, the local controller 104 can dictate data access to and from the data medium 112 by spinning the spindle motor 114 and articulating the actuating arm 122. It should be noted that control of the data transducing assembly 106 is not limited to the local controller 104 as various remote computing components can utilize the transducing assembly 106 across a network 124 via appropriate communications protocol.

The diverse connectivity options provided by the data storage system 100 can utilize any type, function, and number of computing components to interact with the data storage device 102. Such options allows for optimized utilization of the data transducing assembly 106 remotely. For example, a remote processor 126 can operate independently or in conjunction with the local controller 104 to write and read data to and from the data medium 112. In another non-limiting example, a remote memory array 128 can be used as temporary storage for data is to be stored in the data storage device 102 at a scheduled time, such as a low system processing window or prior to system 100 power down. The system 100 configuration of both local and remote components operating to store data can complement the miniaturization of the physical size of the computing components to realize greater data capacity.

Figure 2:
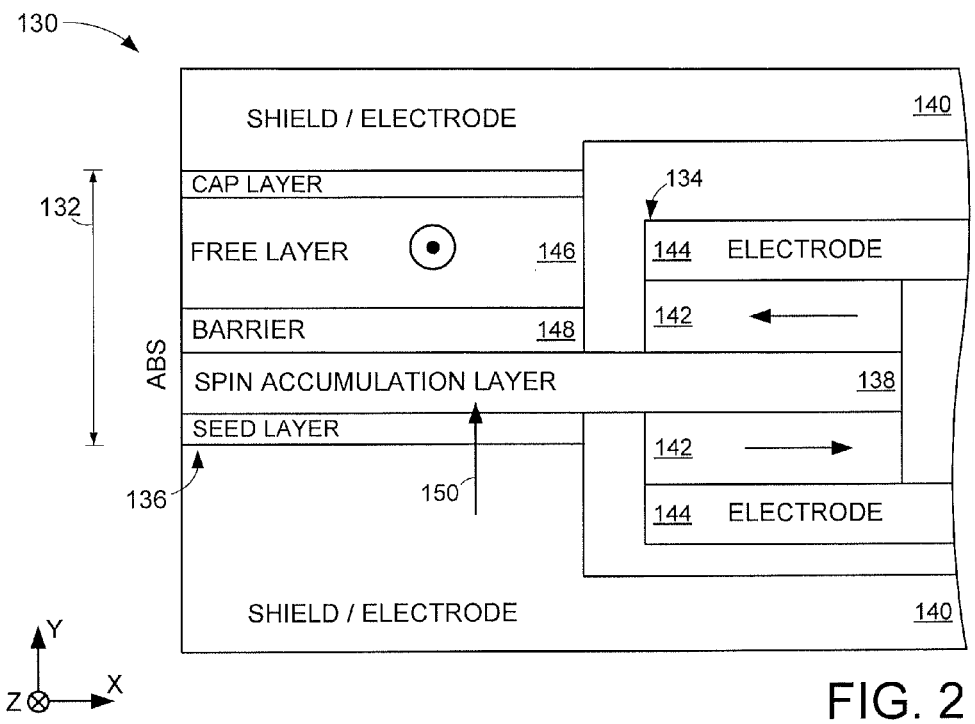
FIG. 2 shows a cross-sectional block representation of a portion of an example data reader capable of being used in the data storage device of FIG. 1.

FIG. 2 displays a cross-sectional block representation of an example data reader 130 that may be incorporated into a data storage device like the data storage device 102 of FIG. 1. In an effort to reduce SSS 132 without reducing the thickness of constituent layers, a lateral spin valve configuration can be practiced, as shown, with separate injector 134 and detector 136 magnetic lamination stacks that share a common spin accumulation layer 138. Positioning the injector stack 134 distal the ABS allows fixed magnetization to be present at the ABS with only the spin accumulation layer 138 contributing to the SSS 132. Conversely, providing a fixed magnetization with a fixed magnetization structure, like an antiferromagnetic layer, in the magnetic stack on the ABS can increase the SSS 132 and mandate reduction in the thickness and magnetic integrity of various stack layers.

The increased thickness of the injector stack 134 afforded by the notch of each magnetic shield 140, which is defined by a reduced thickness distal the ABS, allows a fixed reference magnetization to be created in the spin accumulation layer 138 by passing current through a ferromagnetic polarizing layer 142 via electrodes 144. The polarizing layer 142 induces a predetermined spin that is propagated towards the ABS and detector stack 136 by the spin accumulation layer 138 where the fixed reference magnetization is compared to the magnetization of the free layer 146 to provide a magnetoresistance that is read across the barrier layer 148 by passing a sensing current 150 through the shields/electrodes 140 at the ABS.

When a sensing current 150 passes through the detector stack 136 via the shields 140, which can act as electrodes, the current can be polarized by the magnetization of the shields 140. The polarization of the sensing current 150 can contaminate the spin accumulation signal in layer 138 and free layer 146. Such corruption of the magnetizations of the detector stack 136 can degrade the magnetic accuracy and performance of the data reader 130, especially when the fixed magnetization is delicate due to the spin accumulation layer 138 having a thickness along the Y axis that is less than the layer's mean free path.

The seed layer of the detector stack 136 may be configured in assorted embodiments as a non-magnetic material like tungsten and chromium with very short spin diffusion lengths, such as lengths of less than 5 nm. Such magnetic material can randomize the spin directions of electrons in the sensing current 150. However, the non-magnetic material can consume a large part of the SSS 132 of the data reader 130, which will have detrimental impact on the linear data bit resolution of the readback head.

It should be noted that a majority spin current carrier is hereby understood to mean a material whose magnetization corresponds with the spin imparted on electrons passing through the material. A minority spin current carrier, in contrast, imparts spin onto passing electrons that opposes the magnetization of the material. The use of a majority spin current carrier as a depolarizing layer is limited to the degree in which spins can be randomized due to the magnetization of the material enforcing a particular magnetization direction, as illustrated by the mere 30% randomization of spins in a majority spin current carrier layer encountering a sensing current.

Figure 3:
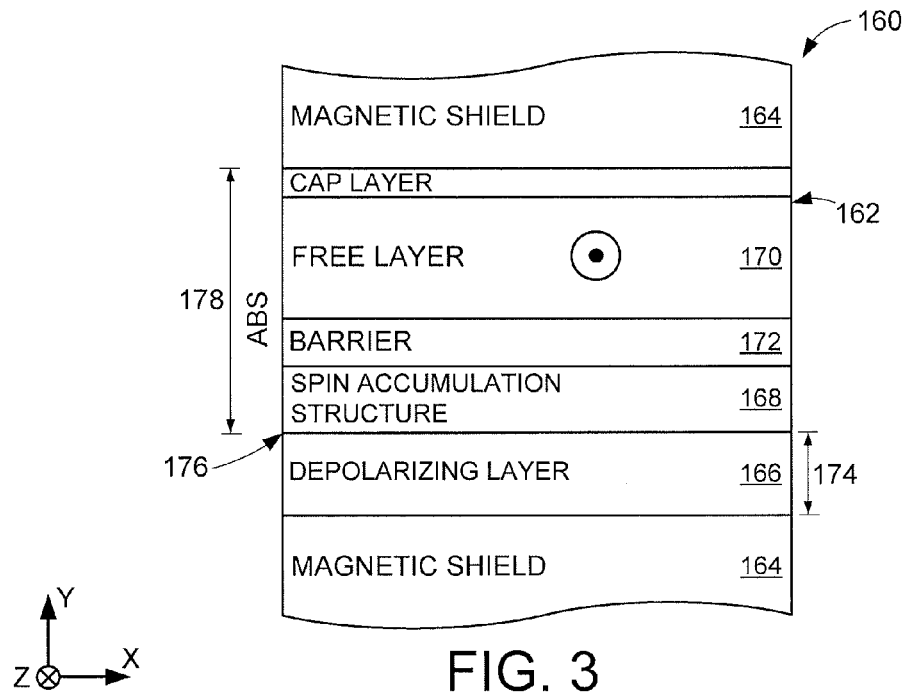
FIG. 3 displays a cross-sectional block representation of a portion of an example data reader configured in accordance with various embodiments.

With linear resolution of the data reader 130 corresponding to the SSS 132 and a 30% reduction in spin polarization in the sensing current 150 potentially contaminating the magnetizations of the detector stack 136, a minority spin current carrier spin depolarizing layer can be inserted between the detector stack 136 and shields 140 to provide a net zero spin polarization for the sensing current 150 without consuming any of the SSS 132. FIG. 3 displays a cross-sectional block representation of a portion of an example data reader 160 constructed and operated in accordance with some embodiments. The data reader has a magnetic stack 162 disposed between magnetic shields 164 and contacts a spin depolarizing layer 166 on an ABS.

The magnetic stack 162 differs from the detector stack 136 of FIG. 2 by being configured as an abutted junction data sensing lamination where a spin accumulation structure 168 is separated from a magnetically free layer 170 by a barrier 172. While the spin accumulation structure is shown and may be constructed as a single layer, assorted embodiments can have multiple layers that collectively comprise the fixed spin accumulation structure 168. Regardless of the configuration of the spin accumulation structure 168, sensing current that injects electrons polarized by the magnetic shields 164 can contaminate the fixed magnetization of the constituent layers.

Accordingly, the spin depolarizing layer 166 can be constructed of a minority spin current carrier magnetic material that has a predetermined thickness 174 that corresponds with passing electrons being randomized and a net zero spin polarization is present at the interface 176 between the spin depolarizing layer 166 and the magnetic stack 162. Moreover, the net zero spin polarization can optimize data reader 160 performance as the depolarizing layer 166 is magnetic and does not contribute to the SSS 178.

Figure 4:
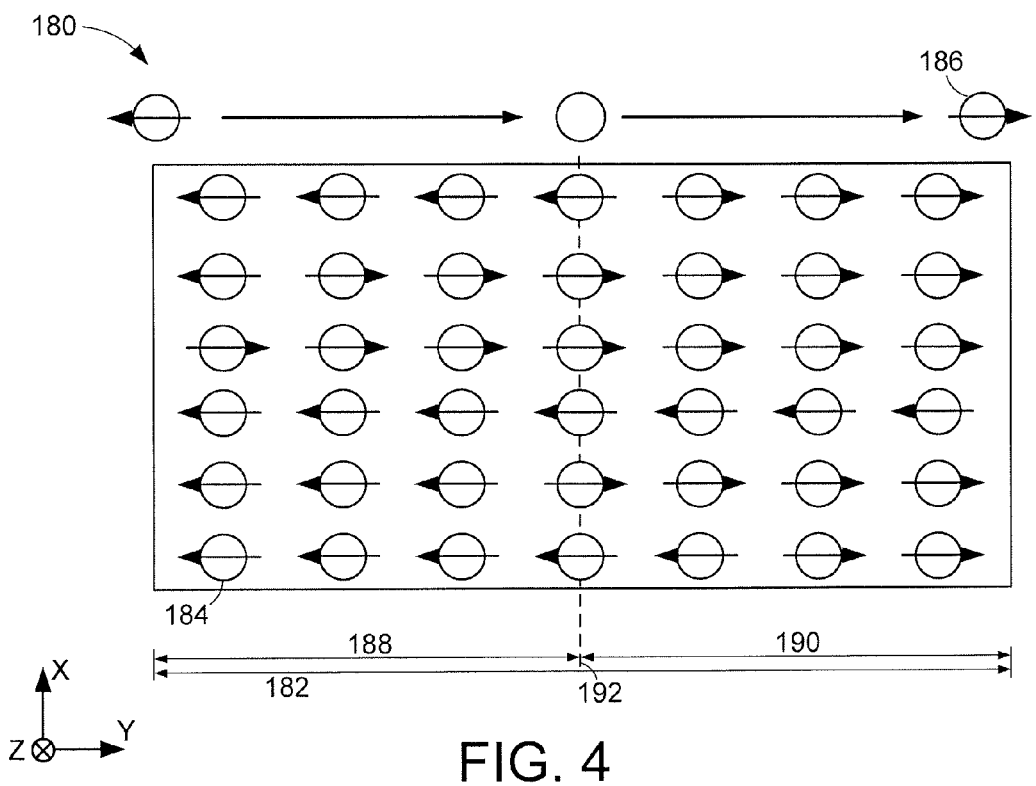
FIG. 4 illustrates a block representation of an example magnetic layer capable of being incorporated in the data reader of FIG. 3 in assorted embodiments.

FIG. 4 generally illustrates a top view block representation of an example spin depolarizing layer 180 that is tuned to provide a net zero spin polarization. In the event the spin depolarizing layer 180 was configured with a long enough thickness 182, a sensing current electron 184 would transition to a particular spin polarization 186 corresponding to the majority or minority spin characteristics of the material. However, tuning the material to be a minority spin current carrier allows entering sensing current electrons 184 to rotate spin polarization despite the magnetization of the material.

Various embodiments tune the spin depolarizing layer 180 to have a reduced tuned thickness 188 that corresponds with the sensing current electrons 184 being partially transitioned to the minority spin polarization of the material. In other words, the tuned thickness 188 is shorter than the overall thickness 182 by a predetermined length 190 to catch the sensing current electrons 184 in a transitional state where the spin polarizations are in equal volume for opposite spin polarizations to produce a net zero spin polarization. That is, making the tuned thickness 188 larger than the net zero polarization thickness, as represented by segmented line 192, would allow more space for the sensing current electrons to transition to the minority spin polarization and provide a net non-zero spin polarization. Likewise, making the tuned thickness 184 smaller would not allow enough material space for half the sensing current electrons 184 to be in a first polarization and half of the electrons 184 to be in an opposite second polarization to produce a net zero spin polarization.

The tuned spin depolarization layer 180 is not limited to a particular thickness as the magnetic characteristics of the layer's material as well as the adjacent magnetic structure can determine what thickness 186 will correspond to a net zero spin polarization at the thickness 186. As a non-limiting example, contacting the spin depolarizing layer 180 with a strong ferromagnetic shield and constructing the depolarizing layer 180 out of weakly magnetic material can correspond with different tuned thicknesses 186 to produce a net zero spin polarization. While the spin depolarizing layer 180 can be constructed of various different materials and have an unlimited number of tuned thicknesses 186, assorted embodiments construct the layer 180 of a nickel alloy like NiCr, NiV, NiFe Cr, and NiFeV with tuned thicknesses of between 10 and 30 nm to accommodate a diverse variety of magnetic stacks and magnetic shield structural and operational configurations.

Figure 5:
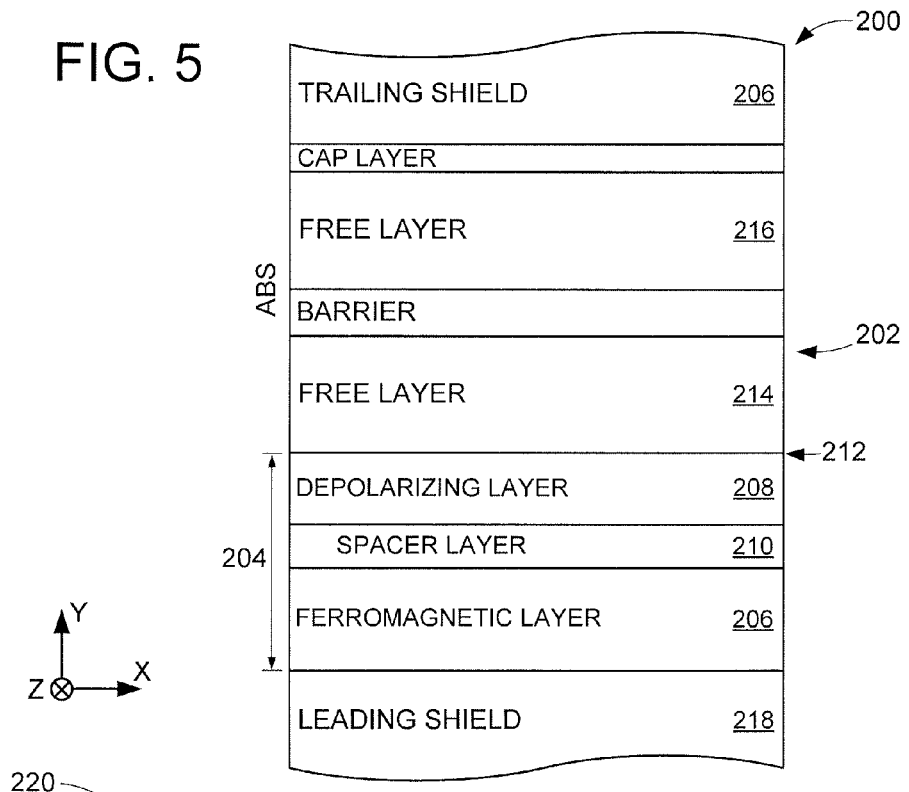
FIG. 5 is a cross-sectional block representation of a portion of an example data reader constructed and operated in accordance with various embodiments.

FIG. 5 provides a cross-sectional block representation of a portion of an example data reader 200 configured in accordance with some embodiments to have a trilayer magnetic stack 202 contacting a synthetic antiferromagnet (SAF) spin depolarizing structure 204 on a first side and a trailing magnetic shield 206 on an opposite second side. The SAF spin depolarizing structure 204 has a ferromagnetic layer 206 separated from a depolarizing layer 208 by a non-magnetic spacer layer 210 that promotes negative RKKY coupling between the layers 206 and 208. In various embodiments, the ferromagnetic layer 206 is a majority spin current carrier that polarizes sense current electrons to a predetermined magnetization before the depolarizing layer 208 randomizes the polarized electrons to provide a net zero spin polarization at the interface 212 between the depolarizing layer 208 and the first free layer 214 of the trilayer magnetic stack 202.

The use of differing magnetic layers 206 and 208 in the SAF spin depolarizing structure 204 ensures that sense current electrons entering the depolarizing layer 208 are polarized in a predetermined direction. In contrast, a single depolarizing layer may have unpredictable spin randomization dependent on the net spin polarization of the sense current entering the depolarizing layer and transitioning over the tuned thickness of the depolarizing layer 208. That is, the ferromagnetic layer 196 polarizes electrons so that the depolarizing layer 208 receives a consistent spin polarization to reliably produce a net zero spin polarization at the interface 212. Such reliable net zero spin polarization corresponds with greater magnetic stack 202 performance as the magnetizations of the first 214 and second 216 free layers are uncontaminated by errant polarized electrons injected from the leading shield 218, which can correspond with optimized magnetic performance for the trilayer magnetic stack 202 that doesn't have a fixed magnetization present.

Figure 6:
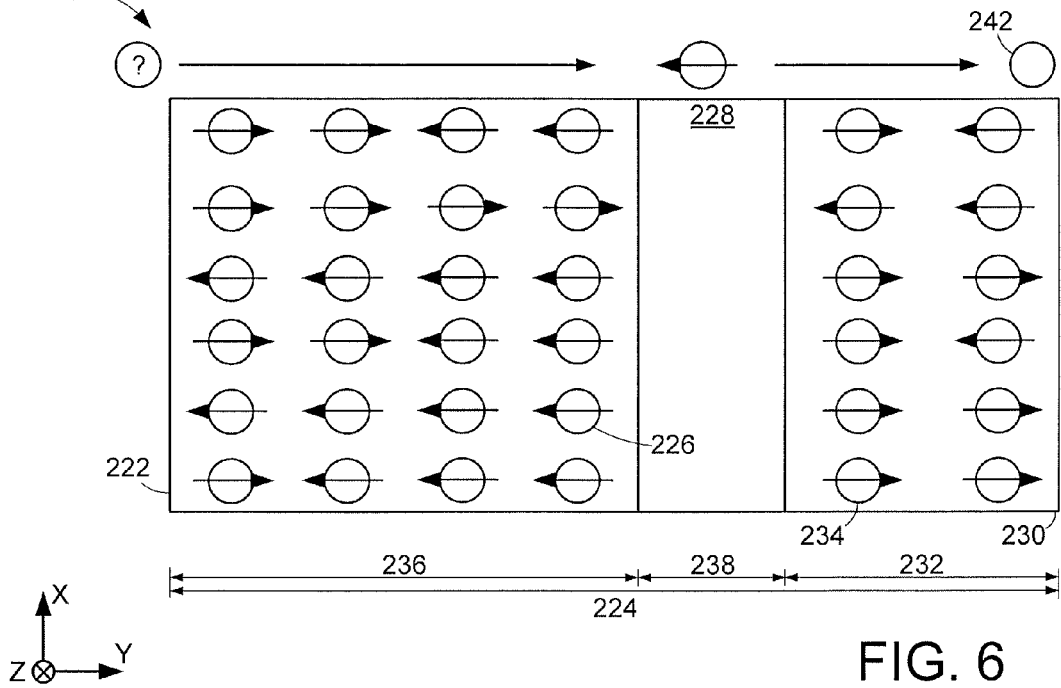
FIG. 6 shows a block representation of an example magnetic lamination capable of being incorporated in the data reader of FIG. 5 in some embodiments.

FIG. 6 shows a block representation of an example SAF spin depolarizing structure 220 tuned in accordance with various embodiments to provide a net zero spin polarization. The SAF spin depolarizing structure 220 has a ferromagnetic layer 222 and a predetermined thickness 224 along the Y axis and the ABS to produce a net non-zero spin polarization in a predetermined direction. Such production is aided by the ferromagnetic layer being constructed of a majority spin current carrier material that allows the magnetization of the ferromagnetic material to set the predetermined net non-zero spin polarization 226 within the predetermined thickness 224.

The magnetic coupling afforded by the non-magnetic spacer layer 228 brings the net non-zero spin polarization to the depolarizing layer 230 where the electrons are randomized over the tuned thickness 232 so that half the electrons 234 are polarized in a first direction and half the electrons are polarized in an opposite second direction. The magnetic coupling between the ferromagnetic 222 and depolarizing 230 layers secures the majority magnetization of the depolarizing layer 230 in a predetermined direction that opposes the majority direction of the ferromagnetic layer 222. Hence, the depolarizing layer 230 may be constructed of a majority spin current carrier material since the magnetization will be set by the ferromagnetic layer's 222 magnetization.

Through assorted tuning operations, the SAF spin depolarizing structure 220 can have a ferromagnetic thickness 236 that is greater than the spacer thickness 238 and the depolarizing layer thickness 232 while being a majority of the overall structure thickness 224. The selected thicknesses 232, 236, and 238 of the various layers can be altered at will, but are configured in FIG. 6 to optimize the probability that a net zero spin polarization will be produced once sense current electrons 242 pass through the depolarizing layer thickness 232. The use of a tuned SAF spin depolarizing structure is also not limited to exclusive implementation in a data reader, as illustrated in FIG. 7.

Figure 7:
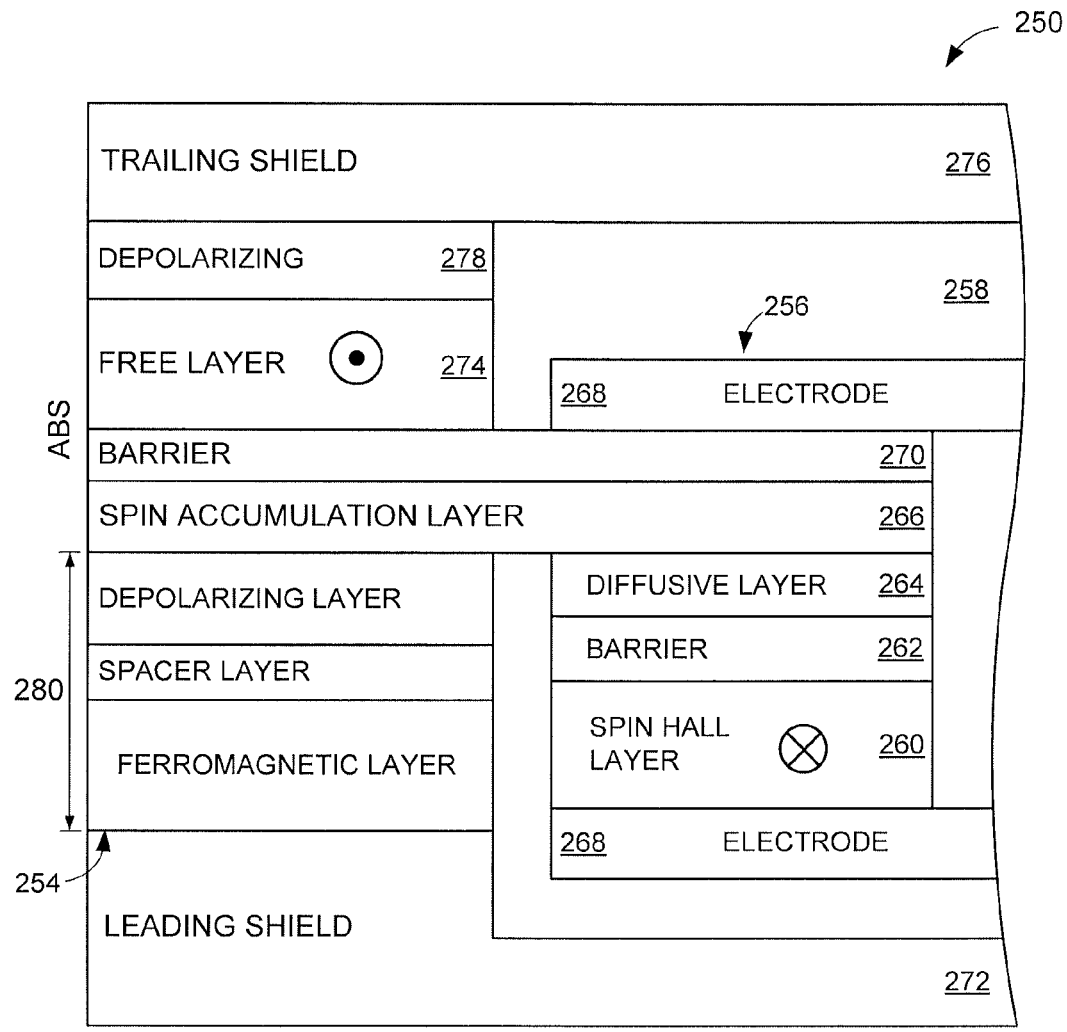
FIG. 7 displays a cross-sectional block representation of a portion of an example data reader configured in accordance with assorted embodiments.

FIG. 7 displays a cross-sectional block representation of a portion of an example data reader 250 configured with a lateral spin valve magnetic stack 252 having a detector stack 254 on the ABS and an injector stack 256 distal the ABS and separated from the detector stack 254 by non-magnetic insulating material 258. The injector stack 256 is configured with a spin Hall effect layer 260 that provides polarized electrons instead of the ferromagnetic polarizing layer 142 of FIG. 2. The spin Hall effect layer 260 can send polarized electrons through barrier 262 and diffusive 264 layers to condition the electrons for orthogonal redirection along the spin accumulation layer 266 towards the ABS in response to current being passed between injector electrodes 268

The spin Hall effect layer 260 may produce a spin polarization that is propagated along the spin accumulation layer 266 more efficiently when the barrier 270 of the detector stack 254 continuously extends from the ABS to have a common stripe height along the X axis as the spin accumulation layer 266. The propagation of polarized electrons from the injector stack 256 to provide a fixed magnetization at the ABS may be nullified if the fixed magnetization is contaminated by a net non-zero spin polarization injected into the spin accumulation layer 266 from the leading shield 272 or into the free layer 274 from the trailing shield 276. Thusly, a depolarizing layer 278 is disposed between the free layer 274 and the trailing shield 276 while a SAF depolarizing lamination 280 is disposed between the spin accumulation layer 266 and the leading shield 272.

It should be noted that the single depolarizing layer 278 and depolarizing lamination 280 may be configured differently, such as both being single layers or both being laminations, in assorted embodiments without limitation. The combination of the SAF lamination 280 contacting the spin accumulation layer 266 while the single depolarizing layer 278 contacts the free layer 274 provides protection from sensing current polarized by either magnetic shield 272 and 276. Various embodiments configure the free layer 274 with a greater thickness than the spin accumulation layer 266 at the ABS, which corresponds with a more stable magnetization, albeit a magnetization sensitive to external fields, than the fixed magnetization of propagated polarized electrons from the injector stack 256.

Accordingly, the single spin depolarization layer 278 can provide ample reliability that sensing current won't contaminate the free layer 274 while the more robust depolarizing lamination 280 contacts the more delicate magnetization of the spin accumulation layer 266. However, with the single depolarizing layer 278 and depolarizing lamination 280 each being magnetic and not contributing to the SSS 282 of the data reader 250, assorted embodiment construct depolarizing laminations on opposite sides of the detector stack 254 on the ABS to provide the highest linear data bit density resolution in the readback head.

Figure 8:
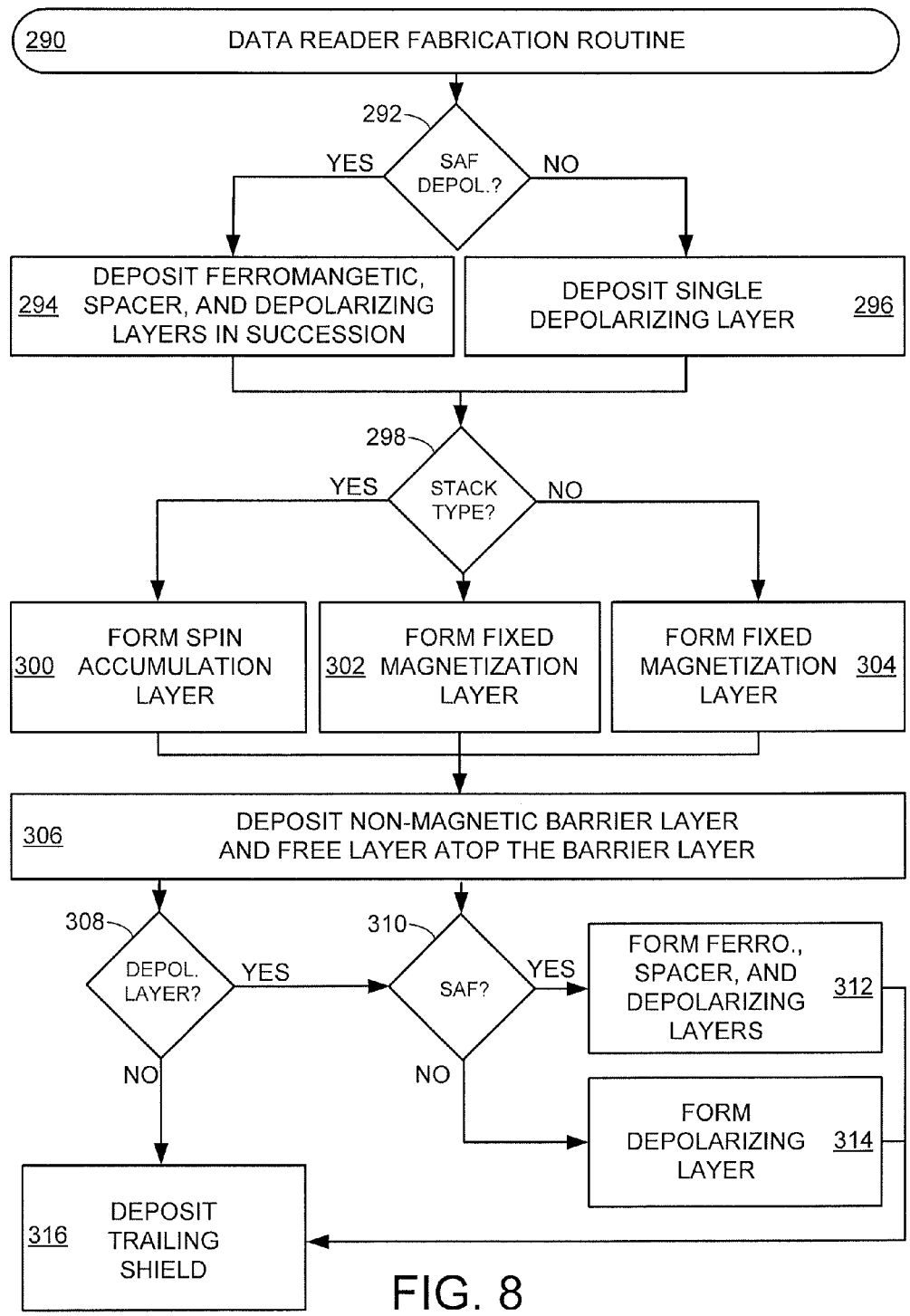
FIG. 8 provides a flowchart of a data reader fabrication routine carried out in accordance with various embodiments.

Turning to FIG. 8, an example flowchart of a reader fabrication routine 290 is provided that maps how a data reader can be tuned in accordance with various embodiments. The routine 290 may begin with the deposition of a magnetic shield on a substrate, but a data reader may alternatively be formed on a substrate sans the magnetic shield and assembled onto a magnetic shield later. Regardless of if a magnetic shield is present, decision 292 evaluates if a SAF depolarization lamination is to be constructed. Step 294 proceeds to deposit a SAF structure with the successive deposition of ferromagnetic, spacer, and depolarizing layers with respective predetermined thicknesses that correspond with a net zero spin polarization. It can be appreciated that various tuned embodiments construct the depolarizing layer with a minority spin current carrier material that has a thickness that is less than the ferromagnetic layer.

Step 296 can alternatively deposit a single minority spin current carrier depolarizing layer with a tuned thickness that provides equal numbers of oppositely spinning electrons when a sensing current passes through the layer. Construction of the depolarizing structure in either step 294 or 296 advances routine 290 to decision 298 where the type of magnetic stack is determined, which may evaluate any number of stacks such as the abutted junction stack of FIG. 3, trilayer stack of FIG. 5, and lateral spin valve stacks of FIGS. 2 and 7.

A choice for a lateral spin valve stack triggers step 300 to form a spin accumulation layer atop the depolarizing structure. The spin accumulation layer may be tuned to have a continuous stripe height that extends from an ABS to a separate injector stack lamination, which may have polarizing, barrier, diffusive, and spin Hall effect layers without limitation.

A choice in decision 298 for a magnetic stack with a fixed magnetization other than a spin accumulation layer is formed in step 302 as one or more magnetic or non-magnetic sublayers. A determination that a trilayer magnetic stack is to be utilized in the data reader conducts step 304 where a free magnetic layer is formed atop the spin depolarizing structure. Construction of a spin accumulation, fixed magnetization, or free magnetization layer then gets a non-magnetic barrier layer and free layer deposited in step 306 to complete the magnetic stack. Assorted embodiments further configure the magnetic stack with seed and cap layers, as shown in FIG. 2, that can be individually tuned to provide predetermined magnetic layer growth and magnetic characteristics, such as anisotropy, for one or more of the constituent layers of the magnetic stack.

The diversity of data reader construction is illustrated by the ability to implement multiple depolarizing structures in a single data reader, which may or may not resemble the data reader 250 of FIG. 7. Decision 308 determines if any depolarizing structure is to be installed between the magnetic stack and trailing magnetic shield. The approval of a depolarizing structure next evaluates the configuration of the depolarizing structure in decision 310 by evaluating if a SAF depolarizing lamination is to be constructed. If a SAF depolarizing structure is to be used, step 312 forms a SAF from ferromagnetic, spacer, and depolarizing layers that may be different materials and thicknesses than a SAF deposited in step 294. If no SAF structure is called for, step 314 form a single continuous layer of depolarizing material, much like, but not limited by, step 296.

In the event decision 308 chooses not to form a depolarizing structure or at the conclusion of the formation of the depolarizing structure from step 312 and 314, respectively, step 316 deposits a trailing shield to complete the data reader. It should be noted that the routine 290 can be used to produce a broad range of data reader types that are customized and optimized to any number of data storage environments, such a high areal density rotating data storage devices. However, the various aspects of routine 290 are not required or limiting as any portion of the routine 290 can be altered, moved, omitted, and added. For example, an additional step of removing portions of the magnetic shields distal the ABS to make room for an injector stack of a lateral spin valve data reader configuration may be conducted prior to decision 292 and step 316.

Through the formation of at least one spin depolarizing structure contacting a magnetic stack portion of a data reader, current contamination of the magnetic stack with spin polarization from adjacent magnetic shields is reduced or eliminated. The ability to tune the material and thickness of the depolarizing layer allows for a range of different depolarizing structures, such as SAF laminations, and materials that are minority spin current carriers tuned for thickness to produce a net zero spin polarization for the magnetic stack. Additionally, the magnetic nature of the depolarizing layer allows the depolarizing structure to be present in a data reader, but not contribute to the shield-to-shield spacing that plays a role in the data bit resolution of a data reader, especially in reduced form factor data storage devices.

It should be noted while the embodiments have been directed to magnetic sensing, the claimed invention can readily be utilized in any number of other applications, including solid state data storage applications. Furthermore, it is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed.

What is claimed:

1. An apparatus comprising a magnetic stack positioned on an air bearing surface (ABS) and contacting a spin depolarizing layer that is a minority spin current carrier, the spin depolarizing layer configured with a thickness and spin diffusion length corresponding to a net zero spin polarization at an interface of the magnetic stack and spin depolarizing layer.

2. The apparatus of claim 1, wherein the magnetic stack comprises a fixed magnetization layer separated from a free magnetization layer by a non-magnetic layer.

3. The apparatus of claim 1, wherein the magnetic stack comprises a first free magnetic layer separated from a second free magnetic layer by a non-magnetic layer, the magnetic stack not having a fixed magnetization.

4. The apparatus of claim 1, wherein the spin depolarizing layer comprises a nickel alloy.

5. The apparatus of claim 4, wherein the nickel alloy is NiCr, NiV, NiFeCr, or NiFeV.

6. The apparatus of claim 1, wherein the spin depolarizing layer is magnetic and does not add to a shield-to-shield spacing of the magnetic stack.

7. The apparatus of claim 1, wherein the spin diffusion length is less than or equal to 5 nm.

8. The apparatus of claim 1, wherein the thickness is greater than the spin diffusion length.

9. A data reader comprising separate detector and injector magnetic stacks sharing a common spin accumulation layer, the detector stack positioned on an air bearing surface (ABS) and the injector stack positioned distal the ABS, the detector stack contacting a first spin depolarizing layer that is a minority spin current carrier, the first spin depolarizing layer having a thickness and spin diffusion length corresponding to a net zero spin polarization at an interface of the common spin accumulation layer and first spin depolarizing layer.

10. The data reader of claim 9, wherein the first spin depolarizing layer is part of a synthetic antiferromagnet (SAF) and is separated from a ferromagnetic layer by a non-magnetic layer.

11. The data reader of claim 10, wherein the first depolarizing and ferromagnetic layers have different thicknesses as measured parallel to the ABS.

12. The data reader of claim 10, wherein the first depolarizing and ferromagnetic layers have different fixed magnetization orientations.

13. The data reader of claim 10, wherein the ferromagnetic layer is a majority spin current carrier.

14. The data reader of claim 9, wherein a second spin depolarizing layer is disposed between a magnetically free layer of the detector stack and a magnetic shield.

15. The data reader of claim 14, wherein the first and second spin depolarizing layers have dissimilar thicknesses as measured parallel to the ABS.

16. The data reader of claim 9, wherein the injector stack comprises a polarizing ferromagnetic layer contacting the common spin accumulation layer.

17. The data reader of claim 9, wherein the injector stack comprises a spin Hall effect layer contacting the common spin accumulation layer.

18. The data reader of claim 9, wherein the spin accumulation layer has a smaller thickness than the first spin depolarizing layer.

19. A method comprising:
positioning a magnetic stack on an air bearing surface (ABS) contacting a spin depolarizing layer that is a minority spin current carrier;
tuning the spin depolarizing layer to have a thickness and spin diffusion length corresponding to a net zero spin polarization at an interface of the magnetic stack and spin depolarizing layer; and
passing a sensing current through the spin depolarizing layer to depolarize the sensing current.

20. The method of claim 19, wherein the sensing current reaches the spin depolarizing layer with a polarized magnetization orientation.

* * * * *